United States Patent
Jackson et al.

(10) Patent No.: US 7,613,809 B2
(45) Date of Patent: Nov. 3, 2009

(54) SUPPORTING EPHEMERAL PORTS IN A VIRTUALIZED ENVIRONMENT

(75) Inventors: Jeff Jackson, Newberg, OR (US); Sergei Gofman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 11/443,565

(22) Filed: May 30, 2006

(65) Prior Publication Data

US 2007/0283015 A1    Dec. 6, 2007

(51) Int. Cl.
*G06F 15/16* (2006.01)

(52) U.S. Cl. .................. 709/226; 709/227; 709/228; 370/252; 370/253

(58) Field of Classification Search ............ 709/224, 709/225, 226; 370/203, 230
See application file for complete search history.

(56) References Cited

U.S. PATENT DOCUMENTS

| | | | |
|---|---|---|---|
| 6,745,221 B1* | 6/2004 | Ronca | 718/104 |
| 2002/0048280 A1* | 4/2002 | Lee et al. | 370/468 |
| 2002/0054587 A1* | 5/2002 | Baker et al. | 370/352 |
| 2003/0037165 A1* | 2/2003 | Shinomiya | 709/238 |
| 2005/0166206 A1* | 7/2005 | Parson | 718/104 |
| 2005/0265252 A1* | 12/2005 | Banerjee et al. | 370/252 |

OTHER PUBLICATIONS http://www.ietf.org/proceedings/08nov/slides/tsvwg-1.pdf "Port Randomization" Michael Larson & Fernando Gont Nov. 16, 2006.*
http://www.icir.org/mallman/papers/ports-ccr09.pdf "Comments on Selecting Ephemeral Ports" Mark Allman.*

* cited by examiner

*Primary Examiner*—Ario Etienne
*Assistant Examiner*—Randy Scott
(74) *Attorney, Agent, or Firm*—Schwabe, Williamson & Wyatt, PCC.

(57) ABSTRACT

Methods, apparatuses, articles, and systems for receiving a request for an allocation of one or more ephemeral ports from a pool of ephemeral ports associated with a physical device, for a virtual machine of the physical device, are described herein. In various embodiments, an ephemeral port manager of the physical device is adapted to allocate up to the one or more ephemeral ports requested from the pool of ephemeral ports, if up to the one or more ephemeral ports are available for allocation from the pool of ephemeral ports. In some embodiments, the ephemeral port manager is further adapted to mark the allocated one or more ephemeral ports as unavailable to meet an ephemeral port allocation request of another virtual machine of the physical device.

20 Claims, 3 Drawing Sheets

SUPPORTING EPHEMERAL PORTS IN A VIRTUALIZED ENVIRONMENT

TECHNICAL FIELD

Embodiments relate to the fields of data processing and data communication, in particular, to methods and apparatuses for supporting ephemeral port allocation to virtual machines on a common platform or physical device.

BACKGROUND

Continuous advancements in virtualization and multi-processor core technology have given rise to the possibility of networking virtual machines on the same platform or physical device. The plurality of virtual machines may appear to each other and to other computing devices as distinct computing systems, each having its own Internet Protocol (IP) address. The virtual machines of a computing device may also share the IP address of the computing device, with each virtual machine using the same, real IP address. Sharing the IP address between multiple virtual machines, however, often requires the plurality of virtual machines to share a pool of ephemeral ports associated with the IP address. Ephemeral ports are assigned on an as needed basis to applications communicating across a network with another system or application. To receive return traffic, an application is assigned an ephemeral port. Multiple virtual machines, not aware of the other virtual machines sharing the computing device, may both allocate the same ephemeral port or ports of the computing device. Further, since the ephemeral ports are associated with the computing device and not any particular virtual machine, routing software of the computing device receiving the return traffic may not know to which virtual machine to route the traffic.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for receiving a request for an allocation of one or more ephemeral ports from a pool of ephemeral ports associated with a physical device, for a virtual machine of the physical device. In various embodiments, an ephemeral port manager of the physical device is adapted to allocate up to the one or more ephemeral ports requested from the pool of ephemeral ports, if up to the one or more ephemeral ports are available for allocation from the pool of ephemeral ports. In some embodiments, the ephemeral port manager is further adapted to mark the allocated one or more ephemeral ports as unavailable to meet an ephemeral port allocation request of another virtual machine of the physical device.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
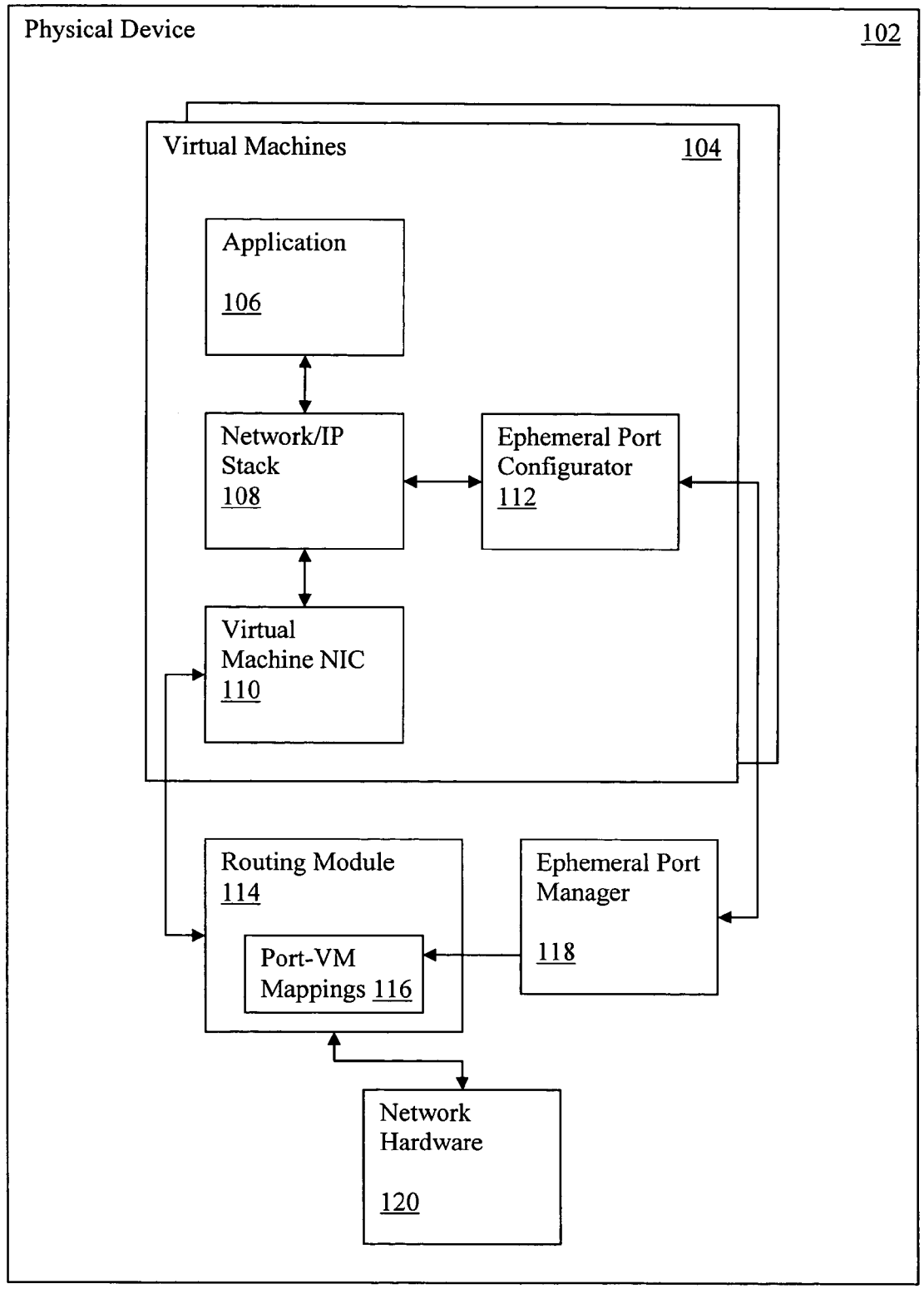
FIG. 1 illustrates an overview of various embodiments of the present invention, supporting ephemeral ports in a virtualized environment of a physical device.

FIG. 1 illustrates an overview of various embodiments of the present invention, supporting ephemeral ports in a virtualized environment of a physical device. As illustrated, platform or physical device 102 comprises a plurality of virtual machines 104 and an ephemeral port manager 118, coupled to each other as shown. As will be described in more detail below, the ephemeral port manager 118, incorporated with the teachings of embodiments of the present invention, is adapted to be able to receive requests from one or more of the virtual machines 104 for allocations of one or more ephemeral ports from the pool of ephemeral ports associated with the physical device 102, to allocate ephemeral ports to the requesting virtual machine 104 or to all virtual machines 104, and to mark the allocated ephemeral ports as unavailable to meet further allocation requests. While embodiments of the invention are described as including a plurality of virtual machines 104, the embodiments of the invention may be practiced with one virtual machine or a plurality of virtual machines.

As illustrated, the physical device 102 includes a plurality of virtual machines 104, a routing module 114 capable of routing packets to and from the virtual machines 104, the routing module 114 having a mapping 116 of ephemeral ports to the virtual machines 104, an ephemeral port manager 118 capable of receiving requests for allocations of ephemeral ports, allocating the ephemeral ports to the virtual machines 104, and marking the allocated ports as unavailable after allocation, and network hardware 120 capable of receiving packets from external systems, sending packets to those systems, and sending packet to and receiving packets from the routing module 114. Additionally, each of the virtual machines 104 includes at least one application 106, a network/IP stack 108 to facilitate network communication for the at least one application 106 and other applications, a virtual machine Network Interface Controller (NIC) 110 to send packets to and receive packets from the routing module 114, and an ephemeral port configurator 112 capable of requesting an allocation of ephemeral ports from ephemeral port manager 118, receiving notification of the allocation, and communicating the allocation to the network/IP stack 108. The various elements are coupled to each other as shown. In various embodiments, network/IP stack 108 and NIC 110, individually or collectively, may abstract and shield all the networking hardware details from application 106.

Figure 3:
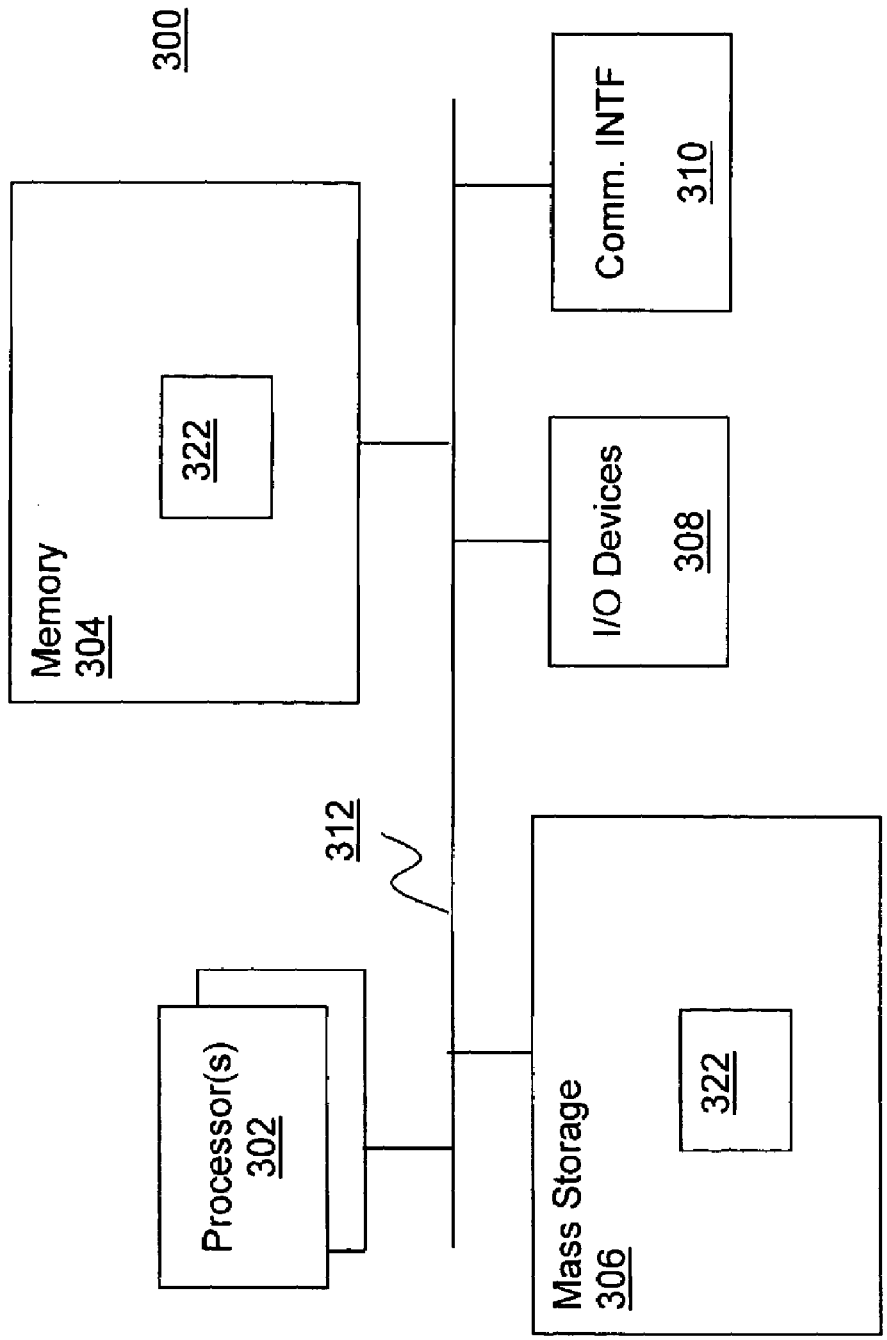
FIG. 3 illustrates an example computer system suitable for use to practice various embodiments of the present invention.

In various embodiments, physical device 102 may be any single- or multi-processor or processor core central processing unit (CPU) computing system known in the art. Physical device 102 may be a personal computer (PC), a workstation, a server, a router, a mainframe, a personal digital assistant (PDA), an entertainment center, a set-top box, or a mobile device. The physical device 102 may be capable of operating a plurality of operating systems of a plurality of virtual machines 104 using virtualization technologies. If physical device 102 is a multi-processor or multi-processor core system, each virtual machine 104 of physical device 102 may, for example, be coupled to a processor or processor core dedicated to that virtual machine 104. In a single processor or single processor core physical device 102, the plurality of virtual machines 104 may share the single processor or processor core. An exemplary single-/multi-processor or processor core physical device 102 is illustrated by FIG. 3, and is described in greater detail below. Hereinafter, including in the claims, processor and processor core shall be used interchangeably, with each term including the other. Physical device 102 may also be coupled to a networking fabric (not shown), described below, and may be identified by an IP address to other devices connected through the networking fabric.

As shown and alluded to earlier, physical device 102 may include a plurality of virtual machines 104. The virtual machines 104, except for the teachings of the embodiments of the present invention, may be any sort of virtual machines. Each virtual machine 104 may be a self-contained operating environment that behaves as if it is a separate computer system. To an outside system coupled to physical device 102 through a networking fabric, however, the virtual machines 104 may appear to be the same computing device, as the plurality of virtual machines 104 share the IP address of the physical device 102. The virtual machines 104 may also each have an operating system capable of managing multiple processes, such as application 106 of each virtual machine 104, and may each have a protected memory space that operationally belongs exclusively to that virtual machine 104, and one or more shared memory spaces, the shared memory spaces accessible for storing and retrieving data by more than one of the virtual machines 104. Suitable virtual machines and virtualization technologies include but are not limited to those available from Microsoft Corporation of Redmond, Wash., and XenSource of Cambridge, UK.

In some embodiments, each of the virtual machines 104 may include at least one application 106, a network/IP protocol stack 108, a virtual machine network interface controller (NIC) 110, and an ephemeral port configurator 112. The at least one application 106 may be any process or sub-process of a virtual machine 104. The application 106 may operate and communicate with the operating system and network/IP stack 108 of the virtual machine 104 in the same way that it might operate with an operating system and network/IP stack of a computing device lacking a virtual environment. The at least one application 106 may seek a connection to exchange data with an application of a remote computing device connected to physical device 102 via a networking fabric. To receive return traffic from the remote device, application 106 might not request any specific port of the physical device 102, and instead may allow the network/IP stack 108 to shield port allocation and usage from the application 106. Network/IP stack 108 automatically tracks and identifies return traffic directed to the application 106.

In various embodiments, the network/IP stack 108 of each virtual machine 104 may be any software implementation of any protocol suite known in the art, such as the Transmission Control Protocol (TCP)/IP protocol suite. The stack 108 may comprise a sub-process or module for each layer, such as a module for the TCP layer, a module for IP layer, etc. Upon receiving a request from an application 106 for a connection to an application of a remote device, the stack 108 may determine an ephemeral port to associate with the application 106 for outbound transmission and receipt of return traffic to application 106. The association, in some embodiments, may only last for the duration of a network connection. The determining may comprise inquiring of the ephemeral port configurator 112 to determine whether one or more ephemeral ports have been allocated to the virtual machine 104. If one or more ephemeral ports have been allocated, stack 108 may retrieve the allocation, from, for example, a data structure associated with the stack 108 or the ephemeral port configurator 112. If one or more ephemeral ports have not been allocated, the ephemeral port configurator 112 may request an allocation, and upon being notified of the allocation, may store the allocation in a data structure of the stack 108 or the ephemeral port configurator 112, and may notify the stack 108 of the allocation. In other embodiments, the determining may simply comprise the stack 108 retrieving a range of ephemeral ports from a data structure.

As is illustrated, the ephemeral port configurator 112 of each virtual machine 104 may comprise any process or module of each virtual machine 104 and, in some embodiments, may be a sub-process of the network/IP stack 108. The ephemeral port configurator 112 may receive an inquiry from the stack 108 to determine whether the virtual machine 104 has been allocated one or more ephemeral ports, as described above. If one or more ephemeral ports have not been allocated, the ephemeral port configurator 112 may request an allocation of one or more ephemeral ports from an ephemeral port manager 118. After such an allocation is then made by the ephemeral port manager 118, the ephemeral port configurator 112 may receive notification of the allocation from the ephemeral port manager 118. The ephemeral port configurator 112 may then store the range of allocated ephemeral ports in a data structure, such as a data structure of ephemeral port configurator 112 or the stack 108. Further, ephemeral port configurator 112 may notify the stack 108 of the allocation through, for example, an application programming interface (API) of the stack 108. In one embodiment, the allocation lasts only for the duration of one or more network connections of the virtual machine 104, and upon termination of the one or more connections, the ephemeral port configurator 112 may notify the ephemeral port manager 118 that the virtual machine 104 no longer requires the allocation of ephemeral ports.

In other embodiments, the ephemeral port configurator 112 may automatically request an allocation of ephemeral ports at initialization/startup of the virtual machine 104. Upon receiving notification of the allocation, the ephemeral port configurator 112 may then store the allocated range where the stack 108 may retrieve the range. In such embodiments, the stack 108 need not inquire of the ephemeral port configurator 112, but merely retrieve the allocated range.

In yet other embodiments, the ephemeral port configurator 112 may simply receive notification of an allocation of one or more ephemeral ports, without requesting the allocation. In such embodiments, the ephemeral port manager 118 may determine an allocation for each of the plurality of virtual machines 104 in response to the request of one virtual machine 104, or may do so automatically at startup. Thus, an ephemeral port configurator 112 need not request an allocation to receive an allocation. Further, if all of the ephemeral ports of the device 102 have been allocated, and an additional virtual machine 104 requests an allocation of ephemeral ports, the ephemeral port manager 118 may reallocate the ephemeral ports and may notify the ephemeral port configurator 112 of the reallocated range of ephemeral ports.

In various embodiments, the virtual machine NIC 110 of each virtual machine may send packets to and receive packets from a routing module 114 of the physical device 102, the routing module 114 in some embodiments managing the network hardware 120. NICs for virtual machines, such as NIC 110, are well known in the art. Accordingly, NIC 110 does not need to be described further.

In some embodiments, not illustrated, the physical device 102 may further comprise a virtual machine manager (VMM), which may have a service operating system (OS). The VMM and service OS may comprise a service partition of the physical device 102, managing the actual hardware resources of device 102 and coordinating the use of the resources between the plurality of virtual machines 104. In one embodiment, the ephemeral port manager 118 and/or the routing module 114 may reside in the VMM and/or the service OS. VMM's and service OS's are both well known in the art, and need not be described further.

As is illustrated, physical device 102 may include an ephemeral port manager 118. The ephemeral port manager 118 may be any process, sub-process, or module of the physical device 102, and in some embodiments may be a sub-process of another process, such as a sub-process of the routing module 114 or a service OS. In some embodiments, such as those described above, the ephemeral port manager 118 may reside in a service partition of the physical device 102, such as a VMM. In other embodiments, the device 102 may instead or also include a management layer (not shown), and the ephemeral port manager 118 may reside in that management layer.

In various embodiments, the ephemeral port manager 118 may receive a request for an allocation of one or more ephemeral ports from an ephemeral port configurator 112 of one or more virtual machines 104. The ephemeral port manager 118 may be considered the owner of the physical device 102's pool of ephemeral ports, necessitating network stacks 108 of virtual machines 104 seeking the allocation of one or more ephemeral ports to request such an allocation from the ephemeral port manager 118, in the manner described in detail above. In one embodiment, the ephemeral port manager may also receive notification from an ephemeral port configurator 112 that its associated virtual machine 104 no longer requires its allocation of ephemeral ports. The ephemeral port manager 118 may then mark those ports as available and notify the routing module 114 of the deallocation and/or update the port-to-virtual machine mappings 116 of the routing module 114.

Upon receiving a request for an allocation of ephemeral ports, the ephemeral port manager 118 may allocate the ephemeral ports. In some embodiments, ephemeral port manager 118 may only allocate ephemeral ports to the requesting virtual machine 104. If the virtual machine 104 requests a certain number of ephemeral ports, the ephemeral port manager 118 may allocate that entire number, or only some portion of that number. A requesting virtual machine 104 need not, however, specify a requested number of ports. In other embodiments, the ephemeral port manager 118 may allocate ports for each virtual machine 104 of the physical device 102 in response to a request from one virtual machine 104. The ephemeral port manager 118 may allocate the entire pool of ephemeral ports, dividing the pool up between the virtual machines 104, or may allocate only a portion of the pool of ephemeral ports, saving some portion for additional virtual machines 104 that have not yet been initialized on the physical device 102. In yet other embodiments, the ephemeral port manager 118 may allocate ephemeral ports to each virtual machine 104 at startup rather than waiting upon a request from a virtual machine 104.

In some embodiments, the ephemeral port manager 118 may then mark the ephemeral ports it has allocated as unavailable for future allocation requests from other virtual machines 104. If the ephemeral port manager receives notification from an ephemeral port configurator 112 that an allocation of ephemeral ports is no longer needed, the ephemeral port manager 118 may mark the ports as available. The ephemeral port manager 118 may include a data structure, such as a database or file, or simply a data object of the ephemeral port manager 118 process storing a list of all of the ephemeral ports and whether each port has been allocated. In one embodiment, this data structure may be the port-to-virtual machine mapping 116 of the routing module 114. The ephemeral port manager 118 may check the data structure prior to allocating ports, to determine if ports are available to allocate.

Upon allocating and marking the ephemeral ports, the ephemeral port manager 118 may, in some embodiments, notify the virtual machine(s) 104 and the routing module 114 of the allocation (or deallocation). The ephemeral port manager 118 may notify only the requesting virtual machine 104 of the allocation, or may notify all of the virtual machines 104 of the device 102 of the allocation. The notification may be sent, in one embodiment, to the ephemeral port configurator 112 of the virtual machine(s), and may specify the ports allocated to the notified virtual machine. Additionally, the ephemeral port manager 118 may notify the routing module 114 of the allocation(s) or deallocation(s) to the one or all virtual machines 104. In other embodiments, rather than notifying the routing module 114 of the allocations or deallocation(s), the ephemeral port manager 118 may simply store the allocations in the port-to-virtual machine mapping 116 of the routing module 114, facilitating the routing module 114 in routing incoming packets to the proper virtual machine 104.

In various embodiments, if the ephemeral port manager 118 has allocated the entire pool of ephemeral ports, but receives a request for allocation from an additional virtual machine 104, the ephemeral port manager 118 may reallocate the ephemeral ports among the virtual machines 104, notifying each virtual machine 104 and the routing module 114 of the reallocation, and remarking the ports to reflect the reallocation.

As illustrated, the physical device 102 may further comprise a routing module 114. The routing module 114 may reside in a service partition of the device 102 or in a management layer of the device 102, and in some embodiments may reside in the same layer or partition as the ephemeral port manager 118. The routing module 114 may be any process, sub-process, or module of the device 102, and may be a sub-process of the ephemeral port manager 118 (or the ephemeral port manager 118 may be a sub-process of the routing module 114). In some embodiments, the routing module 114 may manage the network hardware 120 of the device 102. In other embodiments, the routing module 114 may instead communicate with a management process of the network hardware. Further, the routing module 114 may manage the virtual machine NIC 110 processes of the virtual machines in sending and receiving packets, thus coordinating the sharing of the network hardware 120 between the virtual machines 104. The routing module 114 may also facilitate the sharing of the device 102 IP address between the virtual machines by determining, based on a port number included in an incoming packet, which virtual machine 104 the packet is destined for, and the routing module 114 may then route the packet to that virtual machine 104 through its NIC 110.

In some embodiments, the routing module 114 may determine which virtual machine 104 to route incoming packets to, based on a port-to-virtual machine mapping 116. The mapping 116 may be a data structure of the routing module 114, such as a database or a file, or may be a data object of the routing module 114 process. The routing module 114 may store mappings in mapping 116 upon being notified of allocations and/or deallocations by the ephemeral port manager 118, or may simply retrieve mappings from mapping 116, the mappings having been stored by the ephemeral port manager 118. Upon retrieving mappings and associating the mappings to the port identified in the incoming packets, the routing module 114 may route the packet to the proper virtual machine 104. Routing modules coordinating resource sharing between virtual machines are well known in the art, and accordingly routing module 114 does not need to be described further.

As is shown, physical device 102 may further comprise network hardware 120. In some embodiments, the network hardware 120 may comprise any networking interface known in the art, including Ethernet interfaces, Bluetooth interfaces, and wireless interfaces. The network hardware 120 may thus consist of a PC card to be received by a PC card port of physical device 102, a miniPCI (mini-Peripheral Component Interconnect) wireless interface, or a radio antenna, the PC Card, miniPCI, and/or antenna facilitating wireless transmission. The network hardware 120 may also or instead consist of an Ethernet port of physical device 102 receiving an Ethernet cable, the cable further connected to, in some embodiments, a router. Further, the network hardware 120 may be capable of receiving data from a networking fabric and transmitting data to that networking fabric. In one embodiment, hardware 120 is managed by the routing module 114. In other embodiments, hardware 120 includes its own management module, which may be communicatively coupled to the routing module 114. Networking interfaces, such as network hardware 120, are well known in the art, and need not be described further.

In some embodiments, physical device 102 may be connected to a networking fabric (not shown) via network hardware 120. The networking fabric may be of any sort known in the art, such as a local area network, a wide area network, or the Internet. Depending on the network hardware 120, physical device 102 may connect to the networking fabric, for example, via Ethernet, Bluetooth, and/or wireless technologies. The connection formed may also be of any sort known in the art, such as a TCP/IP connection or an asynchronous transfer mode (ATM) virtual connection.

In alternate embodiments, some or all of these components, i.e. the routing module, ephemeral port manager, etc., may be combined. In other embodiments, one or more of these components may be implemented as multiple components. In still other embodiments, embodiments of the invention may be practiced with other additional elements.

Figure 2:
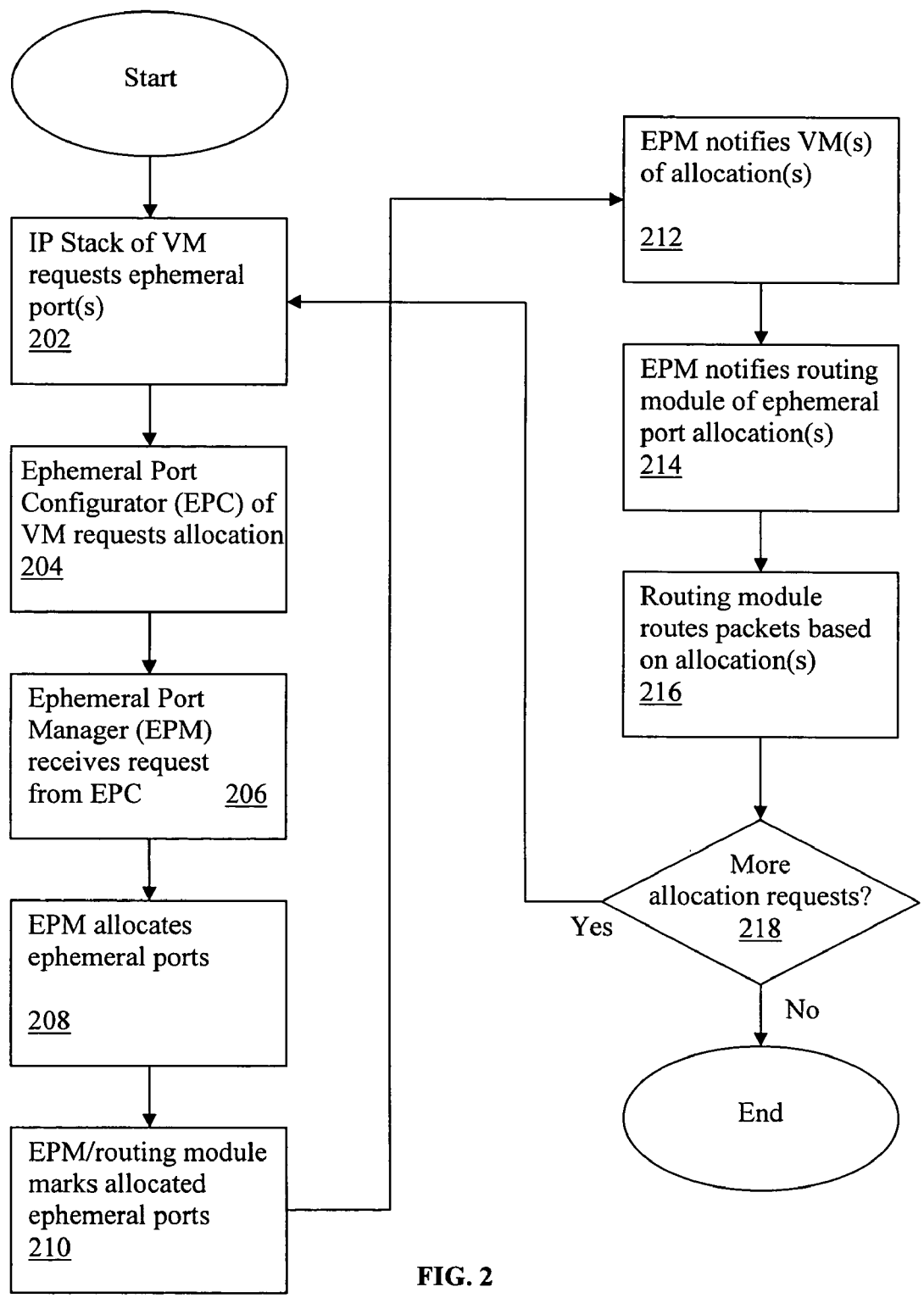
FIG. 2 illustrates a flow chart view of selected operations of the methods of various embodiments of the present invention, to enable allocation of ephemeral ports to virtual machines on a common platform or physical device.

FIG. 2 illustrates a flow chart view of selected operations of the methods of various embodiments of the present invention, to enable allocation of ephemeral ports to virtual machines on a common platform or physical device. As illustrated, a method of an embodiment may involve a network/IP stack of a virtual machine of a physical device requesting an ephemeral port, and an ephemeral port configurator of the virtual machine receiving the request from the stack and requesting an allocation of ephemeral ports, blocks 202-204. As discussed earlier, in various embodiments, an application of a virtual machine may request the network/IP stack of the virtual machine to establish a connection to an application of a remote device, and to select a port from a pool of ephemeral ports to receive return traffic destined for the application. The network/IP stack may then request an ephemeral port from the ephemeral port configurator of the virtual machine, block 202. The ephemeral port configurator may next determine if the virtual machine has received an allocation of ephemeral ports. If the virtual machine has not received an allocation, the ephemeral port configurator may request an allocation of ephemeral ports from the ephemeral port manager of the physical device, block 204. The ephemeral port manager may be responsible for allocating the pool of ephemeral ports of the physical device between the virtual machines of the device.

Upon receiving a request for an allocation of ephemeral ports, the ephemeral port manager may allocate ephemeral ports to the requesting virtual machine and/or all virtual machines of the physical device, may mark the ports allocated as unavailable after allocation, and may notify the virtual machine(s) and the routing module of the physical device of the allocation(s), blocks 206-214.

More specifically, in various embodiments, the ephemeral port manager may receive the request for an allocation of one or more ports from the ephemeral port configurator of a virtual machine, block 206. In response, the ephemeral port manager may allocate ephemeral ports to the requesting virtual machine or to all virtual machines of the physical device, block 208. The ephemeral port manager may then mark the allocated ephemeral ports as unavailable for allocation to another requesting virtual machine, block 210. Further, the ephemeral port manager may next notify the requesting virtual machine or all virtual machines of the allocation(s), the notifications provided in some embodiments to the ephemeral port configurators of the virtual machines, block 212, and may also notify the routing module of the physical device of the allocation(s), block 214, to facilitate the routing module in routing received packets to the appropriate virtual machine.

Upon being notified of the allocation(s) of ephemeral ports, the routing module of the physical device may store mappings representing the virtual machines and the ephemeral ports allocated to each virtual machine. The routing module may then use the mappings to route incoming packets to the proper virtual machine, block 216.

Thereafter, blocks 202-216 are repeated until all allocation requests have been met, block 218, allocating at least the requesting virtual machines allocations of ephemeral ports. Accordingly, virtual machines may effectively share an IP address of a physical device and a pool of ephemeral ports through an ephemeral port manager allocating ephemeral ports to the virtual machines.

FIG. 3 illustrates an example computer system suitable for use to practice various embodiments of the present invention. As shown, computing system 300 includes one or more processors 302, and system memory 304. Additionally, computing system 300 includes mass storage devices 306 (such as diskette, hard drive, compact disc read only memory (CD- ROM) and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown). In various embodiments, mass storage devices 306 may be divided into multiple partitions for use by the virtual machines, with each virtual machine having exclusive use of the assigned partition.

Each of these elements performs its conventional functions known in the art. In particular, system memory 304 and mass storage 306 may be employed to store a working copy and a permanent copy of the programming instructions implementing the various components of the various virtual machines and of the computer system, herein collectively denoted as 322. As described earlier, the various components may include an ephemeral port manager, a routing module, and/or one or more ephemeral port configurators. The various components may be implemented as assembler instructions supported by processor(s) 302 or high level languages, such as C, that can be compiled into such instructions.

The permanent copy of the programming instructions may be placed into permanent storage 306 in the factory, or in the field, through, for example, a distribution medium (not shown), such as a compact disc (CD), or through communication interface 310 (from a distribution server (not shown)). That is, one or more distribution media having one or more of an implementation of the ephemeral port manager, an implementation of the routing module, and one or more implementations of the ephemeral port configurators may be employed to distribute these components and program various computing devices.

The constitution of these elements 302-312 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method for allocating one or more ephemeral ports to one or more virtual machines instantiated on a physical device, each virtual machine having an operating system controlling instruction executions within the virtual machine, each virtual machine further having a network stack facilitating communication with a network for the virtual machine, the network being coupled to the physical device, the method comprising:
receiving, by an ephemeral port manager of the physical device, a request for an allocation of one or more ephemeral ports from a pool of ephemeral ports associated with a physical device, for a first virtual machine of the physical device;
allocating, by the ephemeral port manager, up to the one or more ephemeral ports requested from the pool of ephemeral ports, if up to the one or more ephemeral ports are available for allocation from the pool of ephemeral ports;
marking, by the ephemeral port manager, the allocated one or more ephemeral ports as unavailable to meet an ephemeral port allocation request of any other virtual machine of the physical device; and
notifying a routing module of the physical device, by the ephemeral port manager, of the allocation of the one or more ephemeral ports allocated to the first virtual machine, the notification facilitating the routing module in routing one or more packets received by the physical device, and addressed to a first port of the up to one or more ephemeral ports, to the first virtual machine which has been allocated the first port.

2. The method of claim 1, wherein each virtual machine further comprises an ephemeral port configurator, and wherein receiving the request for the allocation of one or more ephemeral ports further comprises receiving the request from the ephemeral port configurator of the first virtual machine.

3. The method of claim 1, further comprising notifying, by the ephemeral port manager, the first virtual machine of the allocation of the up to one or more ephemeral ports.

4. The method of claim 1, further comprising routing, by the routing module, received packets addressed to the first port of the up to one or more ephemeral ports to the first virtual machine which has been allocated the first port.

5. The method of claim 1, wherein the first virtual machine and each other virtual machine of the physical device share an Internet Protocol address of the physical device.

6. The method of claim 1, further comprising:
receiving, by the ephemeral port manager, a request for an allocation of an additional one or more ephemeral ports from a second virtual machine of the physical device;
if the entire ephemeral port pool has been allocated, reallocating, by the ephemeral port manager, the ephemeral ports of the ephemeral port pool;
marking, by the ephemeral port manager, the reallocated ephemeral ports as unavailable to meet an ephemeral port allocation request of any other virtual machine of the physical device; and
notifying, by the ephemeral port manager, each of the virtual machines of the physical device of each virtual machine's respective allocation of ephemeral ports, based on the reallocation, and notifying, by the ephemeral port manager, a routing module of the physical device of the reallocation.

7. A computing device comprising:
one or more processors configurable to operate one or more virtual machines instantiated on the computing device, each virtual machine having an operating system controlling instruction executions within the virtual machine, each virtual machine further having a network stack facilitating network communication with a network for the virtual machine, the network being coupled to the computing device;
an ephemeral port manager instantiable into an ephemeral port manager instance within a virtual machine manager operated by one of the one or more processors to
receive a request for an allocation of one or more ephemeral ports from a pool of ephemeral ports associated with the computing device, for a first virtual machine of the computing device;
allocate up to the one or more ephemeral ports requested from the pool of ephemeral ports, if up to the one or more ephemeral ports are available for allocation from the pool of ephemeral ports; and
mark the allocated one or more ephemeral ports as unavailable to meet an ephemeral port allocation request of any other virtual machine of the computing device; and
a routing module, operable by one of the one or more processors to route one or more packets received by the physical device, and addressed to a first port of the up to one or more ephemeral ports, to the first virtual machine which has been allocated the first port;

wherein the ephemeral port manager instance is configured to notify the routing module of the allocation of up to one or more ephemeral ports allocated to the first virtual machine.

8. The computing device of claim 7, further comprising a service operating system, the service operating system including the ephemeral port manager.

9. The computing device of claim 7, wherein each virtual machine further comprises an ephemeral port configurator, and wherein the ephemeral port manager instance is configured to receive the request from the ephemeral port configurator of the first virtual machine.

10. The computing device of claim 7, wherein the ephemeral port manager instance is further operated by one of the one or more processors to notify the first virtual machine of the allocation of the up to one or more ephemeral ports.

11. The computing device of claim 7, wherein the ephemeral port manager is a part of the routing module.

12. The computing device of claim 7, wherein the first virtual machine and each other virtual machine of the computing device share an Internet Protocol address of the computing device.

13. The computing device of claim 7, wherein the ephemeral port manager instance is further operated by one of the one or more processors to
receive a request for an allocation of an additional one or more ephemeral ports from a second virtual machine of the computing device;
if the entire ephemeral port pool has been allocated, reallocate the ephemeral ports of the ephemeral port pool;
mark the reallocated ephemeral ports as unavailable to meet an ephemeral port allocation request of any other virtual machine of the computing device; and
notify each of the virtual machines of the computing device of each virtual machine's respective allocation of ephemeral ports, based on the reallocation, and notify the routing module of the reallocation.

14. An article of manufacture comprising:
a tangible computer-accessible storage medium; and
a plurality of programming instructions stored in the tangible computer-accessible storage medium and configured to enable a computing device, when the programming instructions are executed by the computing device, to
receive, using an ephemeral port manager, a request for an allocation of one or more ephemeral ports to a virtual machine of one or more virtual machines instantiated on the computing device, from a pool of ephemeral ports associated with the computing device, each virtual machine having an operating system controlling instruction executions within the virtual machine, each virtual machine further having a network stack to facilitate communication with a network for the virtual machine, the computing device being coupled to the network;
allocate, using the ephemeral port manager, up to the one or more ephemeral ports requested from the pool of ephemeral ports to the virtual machine, if up to the one or more ephemeral ports are available for allocation from the pool of ephemeral ports;
mark, using the ephemeral port manager, the allocated one or more ephemeral ports as unavailable to meet an ephemeral port allocation request of any other of the one or more virtual machines instantiated on the computing device; and
notify a routing module of the computing device, using the ephemeral port manager, of the allocation of up to one or more ephemeral ports to the virtual machine, the notification facilitating the routing module in routing one or more packets received by the computing device, and addressed to a first port of the up to one or more ephemeral ports, to the virtual machine which has been allocated the first port.

15. The article of claim 14, wherein the plurality of programming instructions is further capable of programming a computing device to notify the virtual machine, using the ephemeral port manager, of the allocation of the up to one or more ephemeral ports.

16. The article of claim 14, wherein the virtual machine and each other virtual machine of the computing device share an Internet Protocol address of the computing device.

17. A system comprising:
one or more processors;
a routing module operated by the processor; and
a mass storage coupled to the one or more processors, and having stored therein, an ephemeral port manager instantiable into an ephemeral port manager instance within a virtual machine manager operated by one of the one or more processors to
receive a request for an allocation of one or more ephemeral ports to a first virtual machine of one or more virtual machines instantiated on the system, from a pool of ephemeral ports associated with the system, each virtual machine having an operating system controlling instruction executions within the virtual machine, each virtual machine further having a network stack facilitating communication with a network for the virtual machine, the system being coupled to the network;
allocate up to the one or more ephemeral ports requested from the pool of ephemeral ports to the first virtual machine, if up to the one or more ephemeral ports are available for allocation from the pool of ephemeral ports;
mark the allocated one or more ephemeral ports as unavailable to meet an ephemeral port allocation request of any other virtual machine of the system; and
notify the routing module of the allocation of up to one or more ephemeral ports to the first virtual machine, the notification facilitating the routing module in routing one or more packets received by the computing device, and addressed to a first port of the up to one or more ephemeral ports, to the first virtual machine which has been allocated the first port.

18. The system of claim 17, wherein the ephemeral port manager instance is further operated by one of the one or more processors to notify the first virtual machine of the allocation of the up to one or more ephemeral ports.

19. The system of claim 17, wherein the first virtual machine and each other virtual machine of the system share an Internet Protocol address of the system.

20. The system of claim 17, wherein the ephemeral port manager instance is further operated by one of the one or more processors to enable the system to
receive a request for an allocation of an additional one or more ephemeral ports from a second virtual machine of the system;
if the entire ephemeral port pool has been allocated, reallocate the ephemeral ports of the ephemeral port pool;
mark the reallocated ephemeral ports as unavailable to meet an ephemeral port allocation request of any other virtual machine of the system; and
notify each of the virtual machines of the computing device of each virtual machine's respective allocation of ephemeral ports, based on the reallocation, and notify the routing module of the system of the reallocation.

* * * * *